US008873017B2

(12) United States Patent
Yabiku et al.

(10) Patent No.: US 8,873,017 B2
(45) Date of Patent: Oct. 28, 2014

(54) LIQUID CRYSTAL DISPLAY DEVICE AND METHOD OF MANUFACTURING THE SAME

(75) Inventors: Hideo Yabiku, Kumamoto (JP); Kazuya Chida, Kumamoto (JP); Toshiaki Fujino, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 129 days.

(21) Appl. No.: 13/533,179

(22) Filed: Jun. 26, 2012

(65) Prior Publication Data
US 2013/0128212 A1    May 23, 2013

(30) Foreign Application Priority Data

Nov. 18, 2011 (JP) ................................ 2011-252519

(51) Int. Cl.
*G02F 1/1339* (2006.01)
*G02F 1/1333* (2006.01)

(52) U.S. Cl.
CPC ............ *G02F 1/1333* (2013.01); *G02F 1/1339* (2013.01)
USPC ............ 349/156; 349/187; 349/153; 349/155

(58) Field of Classification Search
CPC ... G02F 1/13; G02F 1/133351; G02F 1/1339; G02F 1/13394; G02F 1/1341; G02F 1/1333; G02F 1/1335; G02F 1/133514; G02F 2001/133388; G02F 2001/13396; H01J 9/26
USPC .......... 349/153, 155, 156, 158, 106, 187, 189
See application file for complete search history.

(56) References Cited

U.S. PATENT DOCUMENTS 6,010,384 A    1/2000   Nishino et al.

FOREIGN PATENT DOCUMENTS

| JP | 5-249422 | 9/1993 |
| JP | 2965976 | 8/1999 |
| JP | 2003-286044 | 10/2003 |
| JP | 2003-337550 | 11/2003 |
| JP | 3889487 | 12/2006 |

OTHER PUBLICATIONS

U.S. Appl. No. 13/443,040, filed Apr. 10, 2012, Kazuya Chida.

*Primary Examiner* — Thoi Duong
(74) *Attorney, Agent, or Firm* — Oblon, Spivak, McClelland, Maier & Neustadt, L.L.P.

(57) ABSTRACT

A liquid crystal display device includes: first and second glass substrates; a seal pattern placed between the first and second glass substrates to bond the first and second glass substrates together, the seal pattern sealing a liquid crystal material in between the first and second glass substrates and holding the liquid crystal material in a liquid crystal layer; a plurality of columnar spacers placed between the first and second glass substrates in a display region surrounded by the seal pattern and corresponding to a display surface appearing when the liquid crystal display device is in operation, the columnar spacers holding a distance between the first and second glass substrates; and a plurality of gap holding members. The area share of the gap holding members indicating the ratio of a sectional area per unit area is larger than the area share of the columnar spacers.

7 Claims, 10 Drawing Sheets

F I G . 1
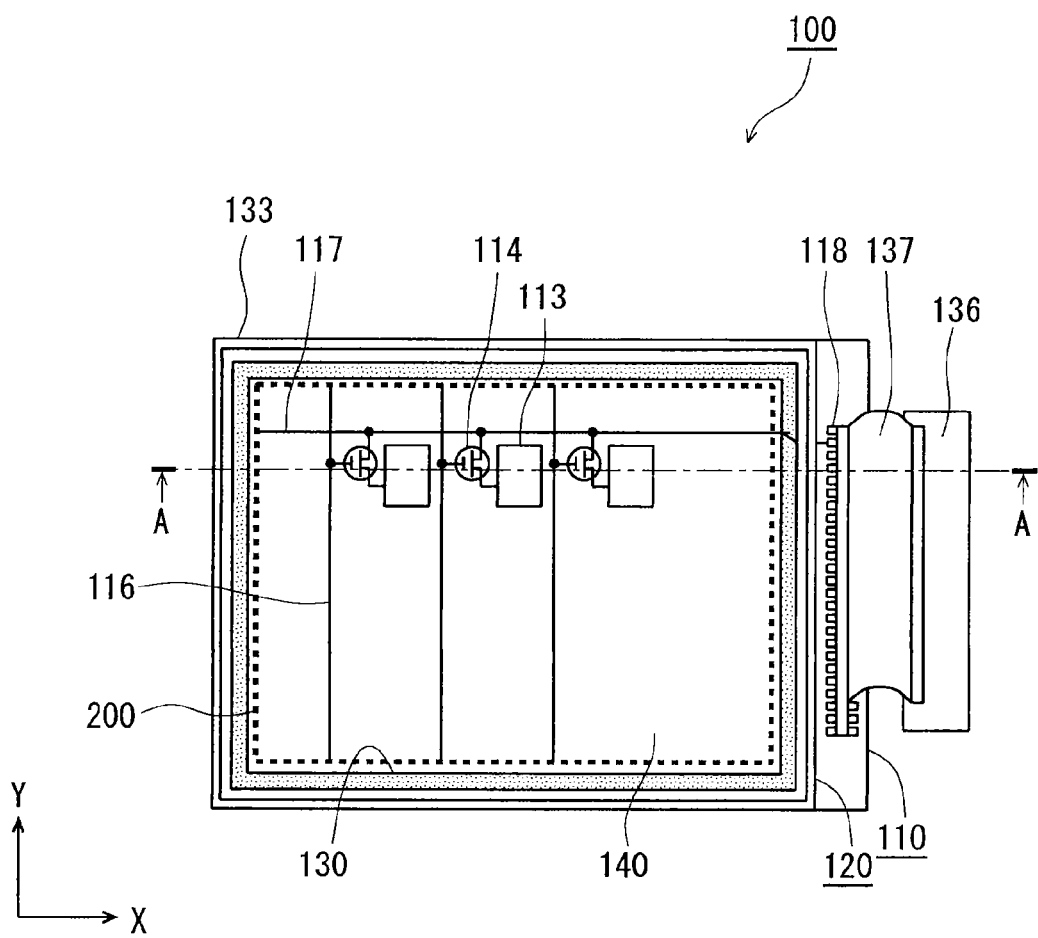

F I G . 3
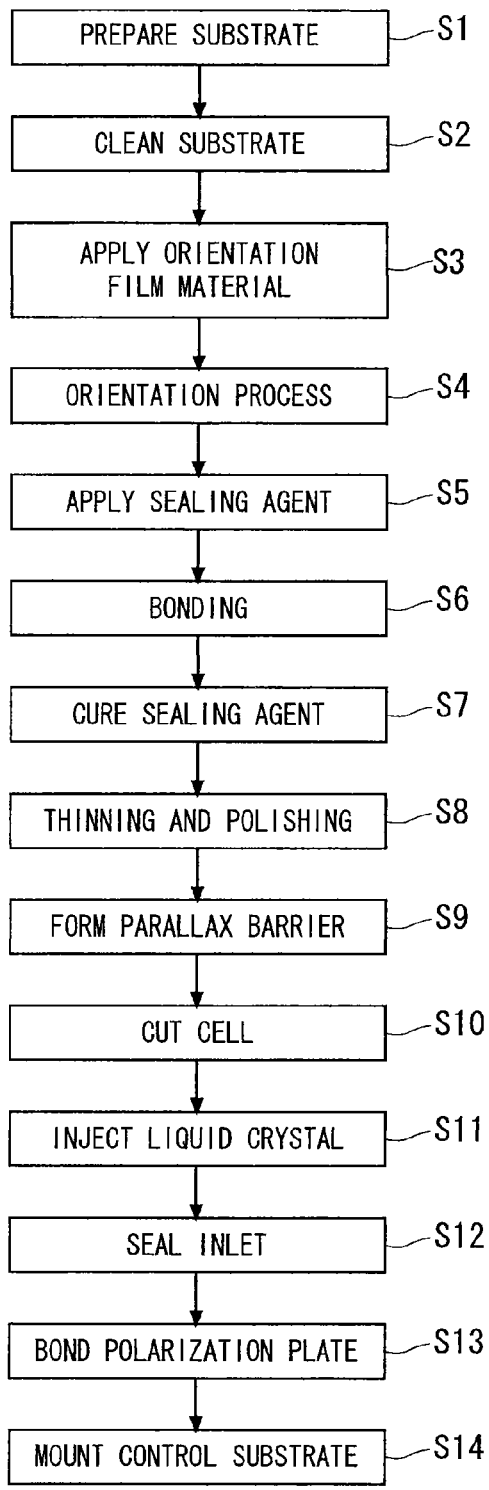

F I G . 4
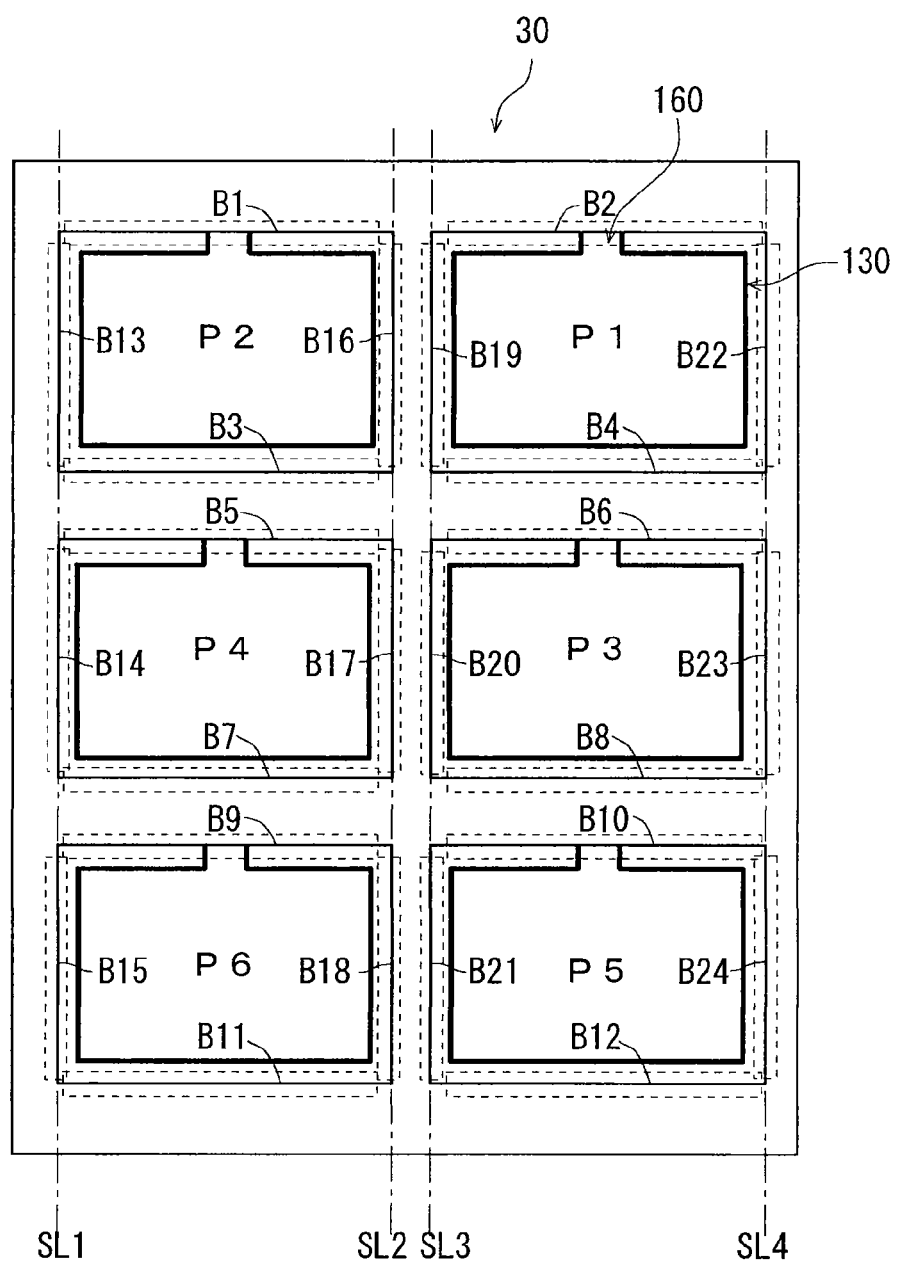

LIQUID CRYSTAL DISPLAY DEVICE AND METHOD OF MANUFACTURING THE SAME

BACKGROUND OF THE INVENTION

1. Field of the Invention

The present invention relates to a liquid crystal display device and more specifically, to a liquid crystal display device using ultrathin glass.

2. Description of the Background Art

Liquid crystal display devices recently suggested include a liquid crystal display device originally intended for curvature (curved display), and a liquid crystal display device capable of displaying two screens (double screen display) for the presence of a parallax barrier placed on a display surface of a liquid crystal panel.

These liquid crystal display devices both use ultrathin glass. As an example, Japanese Patent Application Laid-Open No. 2003-337550 is intended to realize a liquid crystal panel capable of being bent flexibly and capable of being used also as a curved display. In order to achieve this intention, Japanese Patent Application Laid-Open No. 2003-337550 discloses a liquid crystal panel using a ultrathin glass substrate made of ultrathin glass and having a thickness of from about 0.01 to about 0.15 mm. Likewise, Japanese Patent Application Laid-Open No. 5-249422 (1993) discloses a liquid crystal panel and a method of cutting the liquid crystal panel. This liquid crystal panel is intended to be used as a reflective liquid crystal display device, and uses a ultrathin glass substrate that is also made of ultrathin glass and having a thickness of from 0.1 to 0.2 mm provided as one of a pair of substrates.

As described above, an ultrathin glass substrate of a thickness of about 0.1 mm is being used widely in liquid crystal display devices including a double screen display, a curved display, and a reflective display. In a step of manufacturing such liquid crystal display devices, while two glass substrates holding a liquid crystal layer therebetween are in the form of cell substrates having the size of a mother substrate, the thickness of at least one of these substrates is reduced to make this glass substrate ultrathin glass, and thereafter, the substrates are cut into the sizes of individual liquid crystal panels.

For cutting of the glass substrates to divide the glass substrates into the liquid crystal panels, a scribe line being a cut flaw showing the starting point of cutting is first formed on a glass surface. More specifically, a scribe line is formed with a scribe cutter (or scribe wheel) on a surface of ultrathin glass between seal patterns of adjacent panels.

When the scribe cutter (or scribe wheel) comes into abutting contact with the surface of the ultrathin glass to apply a load thereon, the ultrathin glass is distorted largely. The amount of the distortion varies depending on the change of a distance between a scribe line and a seal pattern. This makes repulsive force unstable, so a scribe line cannot be formed favorably.

Further, fluctuations of a seal position, a seal width, and the accuracy of a scribe line are generated even on the same scribe line to make it impossible to keep a distance between a seal and a scribe line constantly. This involves change of a scribe condition.

As a result, a cutting damage such as a tiny crack may be left in a cutting surface, or a glass substrate may be broken during its cutting. Such a failure reduces yields.

In response to the aforementioned problems, a seal pattern to bond glass substrates as a pair together may be placed directly below a scribe line, or a supporting member used to avoid distortion of glass may be provided directly below or near a scribe line.

In order to place a seal pattern directly below a scribe line, a seal peeling support layer should be formed in advance on a TFT (thin-film transistor) to peel a seal member stably when a fragment at a terminal extraction part is removed, for example. Even in this case, it may still be hard to peel a seal member stably without involving a damage on the TFT substrate.

Meanwhile, forming a supporting member used to avoid distortion of glass and placing the supporting member directly below or near a scribe line by using the same material and the same technique as those of a columnar spacer does not generate a problem to be caused during removal of a fragment at a terminal extraction part. However, the supporting member is formed before a rubbing step. So, if placed on the upstream side of rubbing process near a display region (downstream side of the rubbing process corresponds to a direction in which a rubbing roller travels), the supporting member becomes an obstacle to the rubbing process. This generates defective orientation of liquid crystal to cause failure such as nonuniform display.

A liquid crystal panel may be manufactured by using vacuum injection process. In this case, an inlet region being an opening portion of a main seal is provided for deaeration or degassing of a cell, or for injection of liquid crystal into the cell, leading to the probability of failing to place supporting members of a number that avoids distortion of ultrathin glass completely. In this case, if supporting members are placed densely in a region of a cutting line including an inlet region and except the inlet region thereof without consideration for distortion of the inlet region, the inlet region and the region except the inlet region cannot be given optimum scribing pressures simultaneously. So, increasing or reducing scribing pressure still generates defective cutting in either region.

SUMMARY OF THE INVENTION

It is an object of the present invention to provide a liquid crystal display device using ultrathin glass capable of improving durability and reliability and capable of being manufactured at low cost as a result of high yield thereof.

An aspect of the present invention is intended for a liquid crystal display device including: first and second glass substrates spaced from each other, the first and second glass substrates being opposite such that main surfaces of the first and second glass substrates face each other; a seal pattern placed between the first and second glass substrates to bond the first and second glass substrates together, the seal pattern sealing a liquid crystal material in between the first and second glass substrates and holding the liquid crystal material in a form of a liquid crystal layer; a plurality of columnar spacers placed between the first and second glass substrates in a display region surrounded by the seal pattern and corresponding to a display surface appearing when the liquid crystal display device is in operation, the columnar spacers holding a distance between the first and second glass substrates; and a plurality of gap holding members placed along the outer circumference of the seal pattern, the gap holding members holding the distance between the first and second glass substrates. The area share of the gap holding members indicating the ratio of a sectional area per unit area is larger than the area share of the columnar spacers.

In this liquid crystal display device, the area share of the gap holding members indicating the ratio of a sectional area per unit area is larger than the area share of the columnar spacers. Thus, edge portions of the gap holding members defined between the first and second glass substrates can be reinforced, and a scribe line can be formed stably in a scribing step during manufacture of the liquid crystal display device. This provides a favorable cutting surface, so that the liquid crystal display device is capable of improving durability and reliability, and capable of being manufactured at low cost as a result of high yield thereof.

An aspect of the present invention is also intended for a method of manufacturing a liquid crystal display device including: first and second glass substrates spaced from each other, the first and second glass substrates being opposite such that main surfaces of the first and second glass substrates face each other; a seal pattern placed between the first and second glass substrates to bond the first and second glass substrates together, the seal pattern sealing a liquid crystal material in between the first and second glass substrates and holding the liquid crystal material in a form of a liquid crystal layer; a plurality of columnar spacers placed between the first and second glass substrates in a display region surrounded by the seal pattern and corresponding to a display surface appearing when the liquid crystal display device is in operation, the columnar spacers holding a distance between the first and second glass substrates; and a plurality of gap holding members placed along the outer circumference of the seal pattern, the gap holding members holding the distance between the first and second glass substrates. The method includes the step of forming the plurality of columnar spacers and the plurality of gap holding members together by using the same material while the first and second glass substrates are first and second mother substrates in a state before the first and second mother substrates are divided into the first and second glass substrates. The step of forming the plurality of gap holding members includes the step of forming the gap holding members discontinuously in first and second columns near the opposite sides of a scribe line centered on the scribe line, the plurality of gap holding members being formed at predetermined intervals as seen in the plan view of the first and second mother substrates. The gap holding members in the first and second columns are arranged in a staggered pattern.

In this method of manufacturing a liquid crystal display device, the step of forming the plurality of gap holding members includes the step of forming the gap holding members discontinuously in the first and second columns near the opposite sides of a scribe line centered on the scribe line, and the gap holding members are formed at predetermined intervals. Further, the gap holding members in the first and second columns are arranged in a staggered pattern. Thus, pressure to be applied to a scribe line can be distributed uniformly in a scribing step to realize stable scribing.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a plan view of a liquid crystal panel of a preferred embodiment of the present invention;

FIG. 3 is a flow chart explaining assembly steps being part of a method of manufacturing the liquid crystal panel of the preferred embodiment of the present invention;

FIG. 4 is a plan view of a mother cell substrate appearing during manufacture of the liquid crystal panel of the preferred embodiment of the present invention;

EMBODIMENT FOR CARRYING OUT THE INVENTION

Preferred Embodiment

<Overall Structure of Liquid Crystal Panel>

Figure 2:
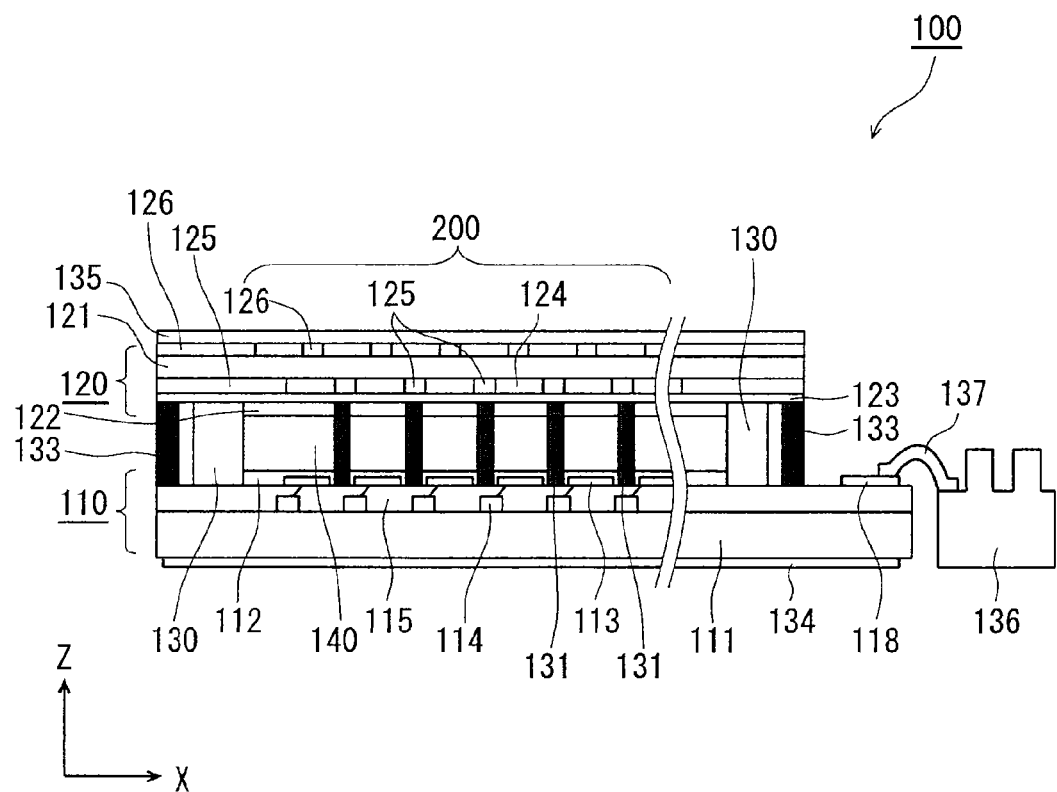
FIG. 2 is a sectional view of the liquid crystal panel of the preferred embodiment of the present invention.

The structure of a liquid crystal panel 100 being a liquid crystal display device of a preferred embodiment of the present invention is described by referring to FIGS. 1 and 2.

FIG. 1 is a plan view of the overall structure of the liquid crystal panel 100. FIG. 2 is a sectional view taken along line A-A of FIG. 1. Here, a TFT (thin-film transistor) liquid crystal panel of a double screen display is described as an example.

As shown in FIG. 1, the liquid crystal panel 100 includes a switching element substrate (hereinafter called a TFT substrate) 110 on which TFTs functioning as switching elements are arranged in an array, a color filter substrate (hereinafter called a CF substrate) 120 on which a color filter and others are formed, and a main seal pattern 130 for sealing a gap between the TFT substrate 100 and the CF substrate 120. In FIG. 1, X indicates a horizontal direction, and Y indicates a perpendicular direction.

The main seal pattern 130 is provided between the TFT substrate 100 and the CF substrate 120 so as to surround at least a display region 200 corresponding to a display surface on which images are displayed while the liquid crystal panel 100 is in operation.

Further, as shown in FIG. 2, a plurality of columnar spacers 131 for forming and keeping a gap of a predetermined range between the TFT substrate 100 and the CF substrate 120, namely a plurality of columnar spacers 131 for keeping a distance between the TFT substrate 100 and the CF substrate 120 within the predetermined range, is provided in the display region 200 and between the TFT substrate 100 and the CF substrate 120. In FIG. 2, X indicates a horizontal direction, and X indicates a thickness direction.

A liquid crystal material is held in a region corresponding at least to the display region 200, and which is part of the gap between the CF substrate 120 and the TFT substrate 110 hermetically sealed with the main seal pattern 130 and maintained by the columnar spacers 131, thereby forming a liquid crystal layer 140. In other words, the liquid crystal material is sealed in space (cell) defined by the TFT substrate 110, the CF substrate 120, and the main seal pattern 130.

A generally used TN (twisted nematic) material is used as the liquid crystal material. The wording "display region 200" includes all of a region on the TFT substrate 110, a region on the CF substrate 120, and a region defined between the TFT substrate 110 and the CF substrate 120 of the liquid crystal panel 100, and which is applied throughout the present specification.

As shown in FIGS. 1 and 2, the TFT substrate 110 is provided with pixel electrodes 113 applying voltages for driving liquid crystal, TFTs 114 being switching elements for supplying voltages to the pixel electrodes 113, an insulating film 115 covering the TFTs 114, a plurality of gate interconnect lines 116 and a source interconnect line 117 for supplying signals to the TFTs 114, a signal terminal 118 receiving signals from outside to be supplied to the TFTs 114, a transfer electrode (not shown in the drawings) for transferring a signal received from the signal terminal 118 to an opposite electrode 123, and others placed on one of main surfaces (main surface facing the CF substrate 120) of a glass substrate 111 that is a transparent substrate composed of generally used glass having a thickness of about 0.7 mm. An orientation film 112 forming the orientation of liquid crystal is provided in a region on the aforementioned main surface of the glass substrate 111 and corresponding to the display region 200. A polarization plate 134 is provided on the opposite main surface of the glass substrate 111.

The CF substrate 120 is provided with color filters 124, and a black matrix (BM) 125 being a light shielding layer for shielding light to block passage of light between the color filters 124 or to block passage of light into a frame region outside a region corresponding to the display region 200. The color filters 124 and the BM 125 are placed on one of main surfaces (main surface facing the TFT substrate 110) of a glass substrate 121 that is a transparent substrate composed of ultrathin glass having a thickness of about 80 μm. A common electrode 123 for driving liquid crystal by generating an electric field between the pixel electrodes 123 on the TFT substrate and the common electrode 123 is formed on the color filters 124 and the BM 125. An orientation film 122 for forming the orientation of liquid crystal is provided on the common electrode 123.

A parallax barrier 126 being a light shielding layer for dividing the direction of the field of view into two to realize a double screen display is formed on the opposite main surface of the glass substrate 121. The parallax barrier 126 is shifted in the planar direction from the BM 125 placed between pixels (between the color filters 124). The parallax barrier 126 lets light pass through. A polarization plate 135 is provided on the parallax barrier 126.

The color filters 124 may be colored layers in which pigments are dispersed in resin. The color filters 124 function as filters for selectively letting light of a specific wavelength range such as red, green and blue pass therethrough. The colored layers of these different colors are arranged regularly to form the color filters 124.

The BM 125 is provided between the color filters 124, and additionally, in the frame region outside the display region 200. The BM 125 extends substantially entirely in the frame region of the CF substrate 120, and blocks passage of light into the CF substrate 120 in the frame region that is not required for display.

Light shielding layers forming the BM 125 and the parallax barrier 126 may be films of stacked structure of metal including chromium and chromium oxide, for example, or may be made of a resin based material with black particles dispersed in resin. An overcoat layer made of a transparent resin film may be provided below the orientation film so as to cover the color filters 124 and the BM 125.

As described above, the TFT substrate 110 and the CF substrate 120 are bonded through the main seal pattern 130, and the columnar spacers 131 placed in the display region 200 space the TFT substrate 110 and the CF substrate 120 apart from each other by a predetermined distance.

The transfer electrode (not shown in the drawings) and the common electrode 123 are electrically connected via a transfer material. A signal received at the signal terminal 118 is transferred to the common electrode 123. The transfer material may be replaced by conductive particles mixed in the main seal pattern 130, or can be omitted.

In the preferred embodiment, the main seal pattern 130 in which conductive particles and the like are mixed is used, and the main seal pattern 130 and the common electrode 123 contact each other as shown in FIGS. 1 and 2. Further, the transfer electrode is placed so as to overlap the main seal pattern 130 as seen in a plan view to make the transfer electrode contact the main seal pattern 130. As a result, the transfer electrode and the common electrode 123 are electrically connected via the main seal pattern 130.

In addition to the structures described above, the liquid crystal panel 100 includes a control substrate 136 for generating a drive signal, an FFC (flexible flat cable) 137 for electrically connecting the control substrate 136 and the signal terminal 118, a backlight unit (not shown in the drawings) functioning as a light source, and others. The backlight unit is generally placed outside the TFT substrate 110 on the opposite side to the CF substrate 120 to become a display surface such that the backlight unit faces the main surface of the TFT substrate 110. These members and the structures described above are housed in a casing together (not shown in the drawings) having an opening portion corresponding to part of the CF substrate 120 outside the display region 200 to become a display surface, thereby forming the liquid crystal display device of the preferred embodiment.

The structure of the frame region on the peripheral part of the panel that is a characteristic feature of the liquid crystal panel 100 is described next in more detail. As shown in FIG. 1, in the liquid crystal panel 100 of the preferred embodiment, a gap holding member 133 for keeping a distance between the substrates (gap between the substrates) during cutting of the substrates is provided outside the main seal pattern 130 in the frame region.

The gap holding member 133 is formed on the CF substrate 120, and is made of the same material as that of the columnar spacers 131. An edge portion of the gap holding member 133 agrees with an edge of the CF substrate 120 as shown in FIG. 1, or is placed inside the edge of the CF substrate 120 while a distance d (in a range of from 40 to 100 μm, for example) is left therebetween. The lower limit of the distance d is determined based on the accuracy of position of a cutting unit. If a cutting unit to be used has higher accuracy of position, the lower limit of the distance d may be smaller. The upper limit of the distance d is determined based on the thickness of the CF substrate 120. If the thickness of a substrate to be used is greater than that of the preferred embodiment, the upper limit may be greater.

Method of Manufacturing Liquid Crystal Display Device
Manufacturing Flow A method of manufacturing the liquid crystal panel 100 of the preferred embodiment is described next by using FIGS. 3 to 6, and by referring to FIGS. 1 and 2.

Generally, a plurality of liquid crystal panels is formed by cutting one or a plurality of liquid crystal panels (multiple panel cutting) from a mother substrate of a size larger than the final shape of the liquid crystal panel. The description given below is based on the assumption that six liquid crystal panels are cut out of a mother substrate, and characteristic assembly steps relating to the present invention are mainly described.

FIG. 3 is a flow chart explaining the assembly steps of the liquid crystal panel 100. First, substrates are prepared in step S1. To be specific, a mother TFT substrate from which the TFT substrate 110 is to be cut, and a mother CF substrate from which the CF substrate 120 is to be cut, are prepared. The mother TFT substrate and the mother CF substrate are not bonded at this time.

The CF substrate 120 is eventually formed into ultrathin glass by thinning of glass. However, in order to perform subsequent steps easily, the mother TFT substrate and the mother CF substrate are composed of glass of a thickness of from about 0.5 to about 1.5 mm halfway through the process.

Here, glass substrates both composed of glass of a thickness of 0.7 mm are prepared as the mother TFT substrate and the mother CF substrate.

The aforementioned step of preparing the mother TFT substrate includes a step of forming the pixel electrodes 113, the TFTs 114, the insulating film 115, the gate interconnect lines 116, the source interconnect line 117, the signal terminal 118 and others shown in FIGS. 1 and 2 on the substrate. These elements are formed in the same manner as those formed on a TFT substrate of a general liquid crystal panel, so the formation thereof is not described in detail.

The step of preparing the mother CF substrate includes a step of forming the color filters 124, the black matrix (BM) 125, the common electrode 123, and others shown in FIGS. 1 and 2 on the substrate. These elements are formed in the same manner as those formed on a CF substrate of a general liquid crystal panel, so the formation thereof is not described in detail.

Next, the mother TFT substrate prepared in step S1 is cleaned in a substrate cleaning step corresponding to step S2.

Then, in an orientation film material applying step corresponding to step S3, an orientation film material is applied onto one of main surfaces of the mother TFT substrate. As an example, this step includes a step of applying an orientation film material composed of an organic material by using printing process, and sintering and drying the orientation film material with a hot plate and the like.

Next, in an orientation step corresponding to step S4, the orientation film material is subjected to rubbing to form an orientation on a surface of the orientation film material, thereby forming the orientation film 112.

The orientation process performed in step S4 is intended to define the direction of orientation of liquid crystal, so it is an important step to form a liquid crystal panel.

The mother CF substrate is also subjected to a substrate cleaning step, an orientation film material applying step, and an orientation step corresponding to steps S2 to S4, thereby forming the orientation film 122.

Next, in a sealing agent applying step corresponding to step S5, a sealing agent is applied as print paste onto one of main surfaces of the mother TFT substrate or the mother CF substrate by using a screen printing unit to form the main seal pattern 130 the final shape of which surrounds the display region 200.

At this stage, the main seal pattern 130 is given an inlet being an opening portion through which liquid crystal is injected, which is described in more detail later.

Next, in a bonding step corresponding to step S6, the mother TFT substrate and the mother CF substrate are bonded together to form a mother cell substrate 30. Then, in a sealing agent curing step corresponding to step S7, the seal pattern 130 is cured completely.

FIG. 4 is a plan view of the mother cell substrate 30 formed by bonding the mother TFT substrate and the mother CF substrate together in the bonding step (step S6).

The preferred embodiment is based on the assumption that six liquid crystal panels P1 to P6 are allocated to the mother cell substrate 30. Further, each of the liquid crystal panels P1 to P6 is given four boundary regions around a cell surrounded by the main seal pattern 130.

To be specific, the liquid crystal panel P1 is given boundary regions B2, B4, B19 and B22. The liquid crystal panel P2 is given boundary regions B1, B3, B13 and B16. The liquid crystal panel P3 is given boundary regions B6, B8, B20 and B23. The liquid crystal panel P4 is given boundary regions B5, B7, B14 and B17. The liquid crystal panel P5 is given boundary regions B10, B12, B21 and B24. The liquid crystal panel P6 is given boundary regions B9, B11, B15 and B18.

The boundary regions B1, B2, B5, B6, B9 and B10 are given opening portions of the main seal pattern 130, and these opening portions become inlets 160 through which liquid crystal is injected.

The cell is divided into the liquid crystal panels by cutting the cell along scribe lines passing through the boundary regions of each of the liquid crystal panels in a cell cutting step. To be specific, the cell is divided into the liquid crystal panels in the vertical direction (direction along the short sides of the panels) by cutting the cell along a scribe line SL1 passing through the boundary regions B13, B14 and B15, a scribe line SL2 passing through the boundary regions B16, B17 and B18, a scribe line SL3 passing through the boundary regions B19, B20 and B21, and a scribe line SL4 passing through the boundary regions B22, B23 and B24. Scribe lines are also defined in the horizontal direction (direction along the long sides of the panels), but these scribe lines are not shown in the drawing.

The liquid crystal display device of the present invention is characterized in that the gap holding member 133 is placed in the boundary regions B1 to B24 on the mother CF substrate, and that the area share of the gap holding member 133 (ratio of spacer area per unit area) is larger than the area share of the columnar spacers 131 placed in the display region 200.

A gap holding member to be placed in the boundary regions B1 to B24 is made of the same material as columnar spacers to be placed in the display region 200, and is formed in the same step as the columnar spacers. Thus, the mother CF substrate can be formed without involving increase of manufacturing steps.

The pattern of the gap holding member to be placed in the boundary regions B1 to B24 is described in detail later.

Referring back to FIG. 3, in a thinning and polishing step corresponding to step S8 performed after the seal pattern 130 is cured, peripheral parts of the mother TFT substrate and the mother CF substrate are sealed to prevent intrusion of a chemical solution in between the substrates. Then, a protective film is attached only to the mother TFT substrate, and the entire mother cell substrate is dipped into a chemical solution mainly containing HF (hydrogen fluoride) to polish a surface of the mother CF substrate, thereby thinning the mother CF substrate. The mother cell substrate 30 thereby provided is such that only the mother CF substrate is thinned to become ultrathin glass of a thickness of about 80 μm, and the mother TFT substrate with the protective film still has a thickness of 0.7 mm.

Next, in a parallax barrier forming step corresponding to step S9, the parallax barrier 126 is formed on a main surface of the thinned mother CF substrate. The parallax barrier 126 is intended to make the liquid crystal panel 100 function as a liquid crystal panel of a double screen display. More specifically, a light shielding layer is formed on the entire main surface of the mother CF substrate. The light shielding layer is a film of stacked structure of metal including chromium and chromium oxide, for example, or may be made of a resin based material with black particles dispersed in resin. Then, in order for the light shielding layer to function as the parallax barrier 126, the light shielding layer is patterned into a shape including opening portions formed at predetermined positions. The parallax barrier 126 is formed by using a conventional technique, so formation thereof is not described in detail.

Next, in a cell cutting step corresponding to step S10, the mother cell substrate after formation of the parallax barrier 126 is cut along scribe lines to divide the mother cell substrate into individual liquid crystal panels.

Figure 5:
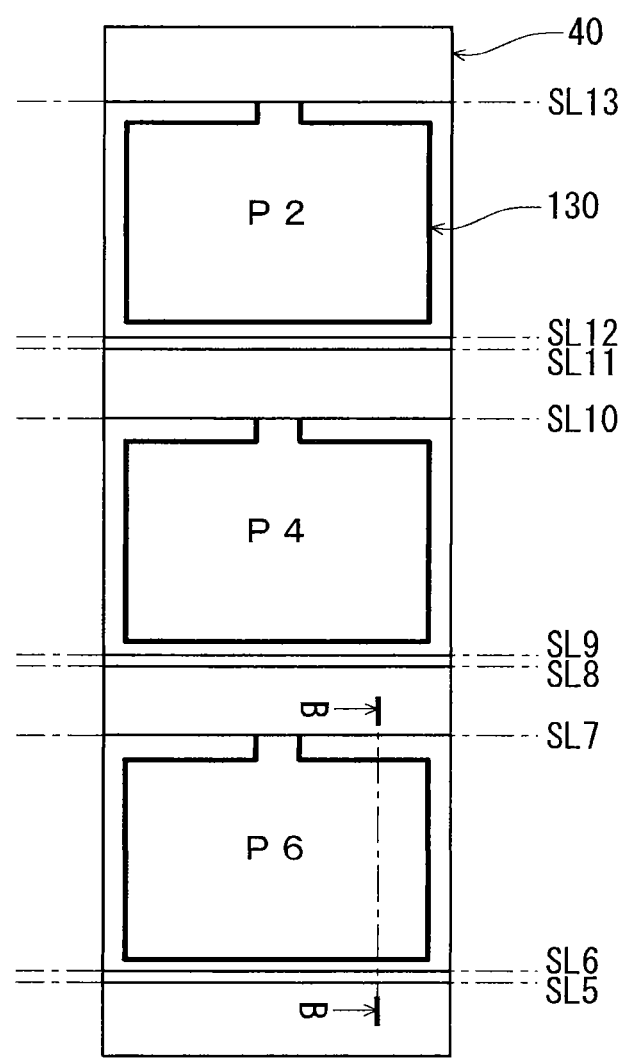
FIG. 5 is a plan view of a strip like substrate appearing during manufacture of the liquid crystal panel of the preferred embodiment of the present invention.

FIG. 5 is a plan view of a strip like substrate 40 at an intermediate stage of cutting obtained by cutting the mother cell substrate 30 along the scribe lines LS1 to LS4 after formation of the parallax barrier 126. The strip like substrate 40 is given scribe lines SL5 to SL13 in the horizontal direction (direction along the long sides of the panels). To be specific, the strip like substrate 40 is given the scribe lines SL5 and SL7 along which the liquid crystal panel P6 is cut, the scribe lines SL8 and SL10 along which the liquid crystal panel P4 is cut, the scribe lines SL11 and SL13 along which the liquid crystal panel P2 is cut, and the scribe lines SL6, SL9 and SL12 along which unnecessary part of the CF substrate is cut.

Figure 6:
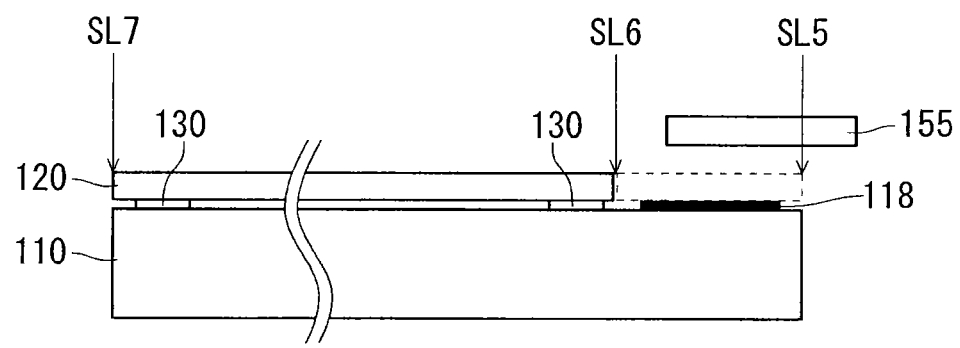
FIG. 6 is a sectional view explaining cutting of a panel out of the strip like substrate appearing during manufacture of the liquid crystal panel of the preferred embodiment of the present invention.

FIG. 6 is a sectional view taken along line B-B of FIG. 5 showing the liquid crystal panel P6 being one of liquid crystal panels cut out of the strip like substrate 40.

In the cell cutting step corresponding to step S10, the cell is divided into the outer dimensions of the panels, and additionally, an unnecessary fragment 155 of the CF substrate 120 is cut out at a place facing an extraction part of the signal terminal 118 on the TFT substrate 110. To be specific, the cell is divided into the outer dimensions of the panels, and thereafter, the CF substrate 120 is cut along the scribe line SL5 to remove the unnecessary fragment 155 as an unnecessary part of the CF substrate 120. The cell cutting step is described in more detail later.

Referring back to FIG. 3, in a liquid crystal injection step corresponding to step S11 performed after division into the outer dimensions of the panels and cutting of the unnecessary part of the CF substrate 120, cells each defined by the TFT substrate 110, the CF substrate 120 and the main seal pattern 130 is filled with liquid crystal.

More specifically, the cutout liquid crystal panels are placed in a vacuum chamber and space inside the vacuum chamber is brought into vacuum with a vacuum pump, thereby expelling air from the cells. Next, the liquid crystal is made to contact the inlets 160 (see FIG. 4) in the vacuum chamber, and then the space inside the vacuum chamber is brought in atmospheric pressure again, thereby sucking the liquid crystal into the cells of the liquid crystal panels.

Next, in an inlet sealing step corresponding to step S12, an UV curable resin is applied to the inlets 160, and thereafter, an UV (ultraviolet) ray is applied to cure the resin, thereby sealing the inlets 160.

Then, in a polarization plate bonding step corresponding to step S13, the polarization plates 134 and 135 are bonded on the outermost surfaces of the TFT substrate 110 and the CF substrate 120 respectively. In a subsequent control substrate mounting step corresponding to step S13, the FFC 137 is attached under pressure to the signal terminal 118 to mount the control substrate 136. Then, the liquid crystal panel on which the control substrate 136 is mounted is assembled into a predetermined casing, thereby completing formation of the liquid crystal display device of the present invention.

<Effect Achieved by Present Invention on Scribing>

In the below, effect on scribing achieved by placing a gap holding member on a boundary region of the mother CF substrate with a scribe line is described by referring to FIGS. 7 to 16.

Figure 7:
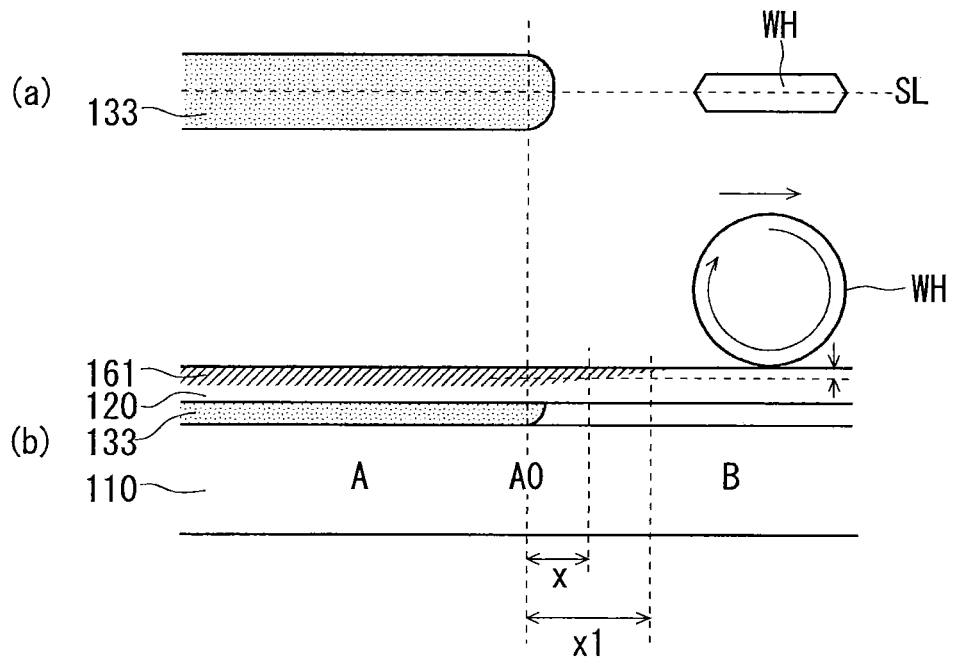
FIG. 7 and FIG. 8 explain an effect achieved by a gap holding member in a cell cutting step during manufacture of the liquid crystal panel of the preferred embodiment of the present invention.

FIG. 7 schematically shows how the ultrathin CF substrate 120 (of a thickness of about 80 μm) is scribed that forms a liquid crystal panel together with the TFT substrate 110 of a general thickness (about 0.7 mm). Part (a) of FIG. 7 is a plan view, and part (b) of FIG. 7 is a sectional view corresponding to the plan view of part (a) of FIG. 7. The thickness of the CF substrate 120 is set to be in a range of from about one-tenth to about one-eighth of the thickness of the TFT substrate 110.

FIG. 7 shows a region A where the gap holding member 133 is provided directly below a scribe line SL, and a region B where the gap holding member 133 is not provided. As shown in part (b) of FIG. 7, a scribe wheel WH travels from the region A where the gap holding member 133 is provided to the region B where the gap holding member 133 is not provided while rotating clockwise on the CF substrate 120. The gap holding member 133 supports the CF substrate 120 in the region A to suppress distortion of the CF substrate 120. So, force is applied sufficiently from the scribe wheel WH to the ultrathin CF substrate 120, thereby developing vertical cracks in the CF substrate 120 to form rib marks 161.

Meanwhile, the gap holding member 133 to support the CF substrate 120 from below is not provided in the region B. So, the CF substrate 120 is distorted while the scribe wheel WH passes thereon to generate escape of force acting on the CF substrate 120. As a result, vertical cracks are not developed so rib marks are not formed.

However, regarding a range within a distance $x1$ from an edge portion A0 of the gap holding member 133, the gap holding member 133 still functions as a supporting member in this range. So, rib marks do not disappear right at the edge portion A0, but they gradually reduce as a distance $x$ from the edge portion A0 becomes greater and disappear completely when the distance $x$ becomes the distance $x1$.

Figure 8:
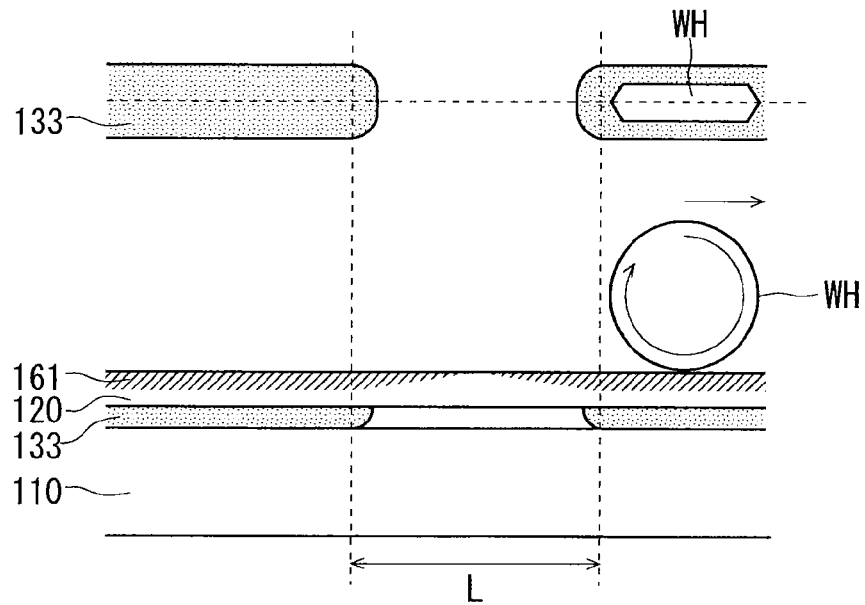

FIG. 8 schematically shows effect achieved by placing two gap holding members 133 apart from each other. As shown in FIG. 8, if the two gap holding members 133 are separated at an interval L and if $L<2\times x1$, the ultrathin CF substrate 120 is supported by one of the gap holding members 133. So, rib marks are formed without interruption even if a gap holding member 133 is not always formed continuously to prevent impairment of the performance of cutting of a glass substrate.

As described above, the gap holding members 133 are required to be formed in the pattern of a dotted line or a dashed line along a scribe line while the interval L between the gap holding members 133 satisfy the relationship of $L<2\times x1$.

Figure 9:
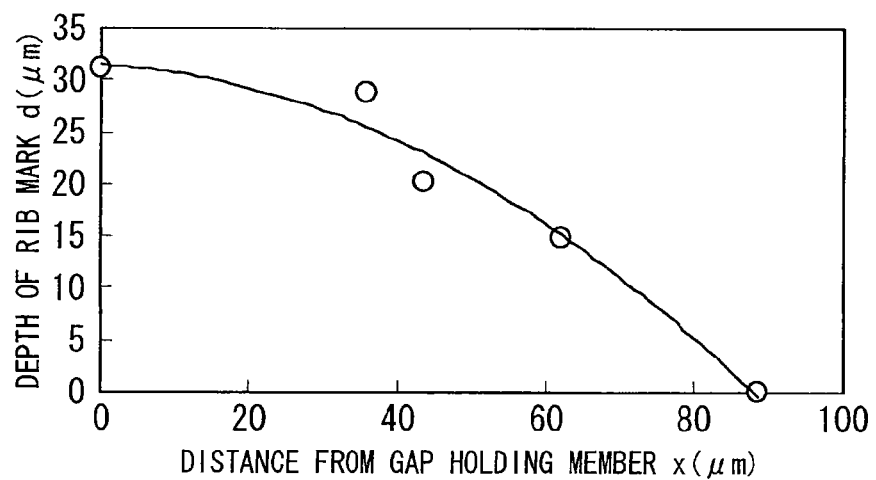
FIG. 9 explains an effect achieved by a gap holding member on the depth of rib marks in the cell cutting step during manufacture of the liquid crystal panel of the preferred embodiment of the present invention.

FIG. 9 shows a relationship between the depth of rib marks and the distance from the edge portion A0 of the gap holding member 133 that is established if the thickness of the CF substrate 120 is 80 µm.

The horizontal and vertical axes of FIG. 9 indicate the distance x (µm) from a gap holding member and the depth of rib marks (µm) respectively. As shown in FIG. 9, rib marks disappear completely if the distance x from the edge portion A0 of the gap holding member 133 is about 90 µm.

So, if the thickness of the CF substrate 120 is 80 µm, and if the gap holding members 133 are placed at several positions at an interval at least shorter than about 180 µm, rib marks are formed continuously to allow stable cutting of a substrate.

The amount of distortion of glass determined when force is applied to the glass is proportionate to the third power of the thickness of the glass. So, an adequate value of the interval L between the gap holding members 133 is inversely proportionate to the thickness t of the glass, and is expressed by a formula (1) given below. Like in the aforementioned example, if the gap holding members 133 are placed at several positions at the interval L satisfying the formula (1), rib marks are formed continuously during scribing to allow stable cutting of a substrate.

$$L < at^3 \qquad (1)$$

where the factor of proportionality a is about 0.0004.

Figure 10:
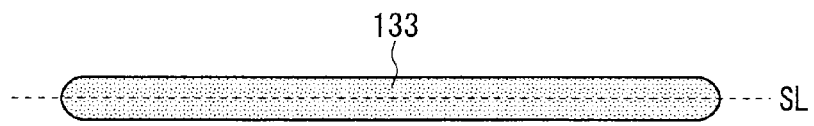
FIG. 10 is a plan view showing a state where a gap holding member is formed continuously along a scribe line.

The columnar spacers 131 and the gap holding member 133 are formed in the step of forming the mother CF substrate during manufacture of the liquid crystal panel the orientation step corresponding to step S4 described by referring to FIG. 3 is performed. The orientation process is process of forming starting points to define the direction of orientation of liquid crystal by rubbing an orientation film with a rotating roller covered with a rubbing cloth. So, if a pattern in the form of a projection such as a gap holding member is formed on the mother CF substrate, the rubbing process may be inhibited at a position near the gap holding member on the downstream side of rubbing. Rubbing is inhibited seriously, particularly if the gap holding member 133 is formed continuously along a scribe line SL as shown in FIG. 10.

Figure 11:
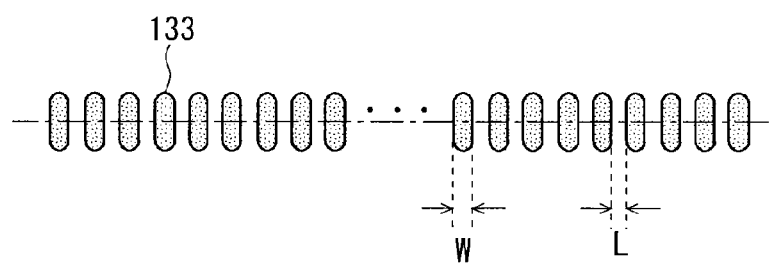
FIGS. 11 and 12 are plan views each showing a state where gap holding members are formed discontinuously along a scribe line.

In this case, rubbing is inhibited less seriously by forming gap holding members discontinuously according to the formula (1). FIG. 11 shows gap holding members 133 formed discontinuously.

As shown in FIG. 11, a plurality of gap holding members 133 is arranged along a scribe line SL at the interval L. If the mother cell substrate 30 is cut along a scribe line while the gap holding members 133 are arranged in this manner in the mother cell substrate 30, the gap holding members 133 are arranged at predetermined intervals along the edges of the TFT substrate 110 and the CF substrate 120 as seen in the plan view of the TFT substrate 110 and the CF substrate 120.

The maximum value of the interval L between the gap holding members 133 can be determined according to the formula (1). The interval L may be reduced if effect on rubbing is small. Further, the size (hereinafter defined as width) W of each of the gap holding members 133 along a scribe line SL is set at 100 µm. The width W is determined by the degree of effect on rubbing, so it is not always 100 µm.

Figure 12:
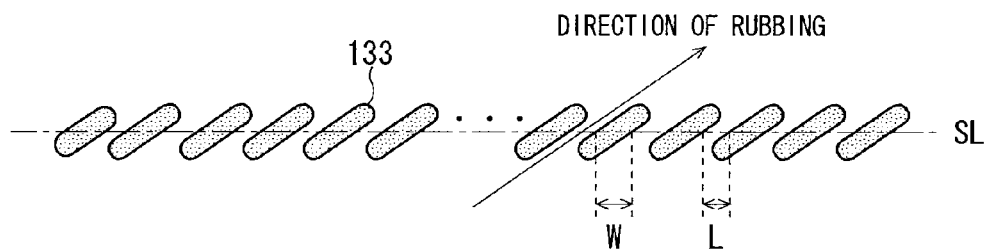

In the example of FIG. 11, the direction of each gap holding member is determined irrespective of the direction of rubbing. Meanwhile, it is better to make the direction of each gap holding member agree with the direction of rubbing as shown in FIG. 12. To be specific, if rubbing proceeds in a direction oblique to a scribe line SL, the gap holding members 133 in the form of ovals are arranged such that the direction of the gap holding members 133, which is specifically the longitudinal direction thereof, agrees with the direction of rubbing. As a result of this arrangement, rubbing is inhibited less likely.

If the mother cell substrate 30 in which the gap holding member 133 are arranged in the aforementioned manner is cut along a scribe line, the gap holding members 133 are arranged at predetermined intervals along the edges of the TFT substrate 110 and the CF substrate 120 as seen in the plan view of the TFT substrate 110 and the CF substrate 120. Meanwhile, the shape of each gap holding member 133 as seen in a plan view is such that the gap holding member 133 is tilted at a predetermined angle from the edges of the TFT substrate 110 and the CF substrate 120.

Figure 13:
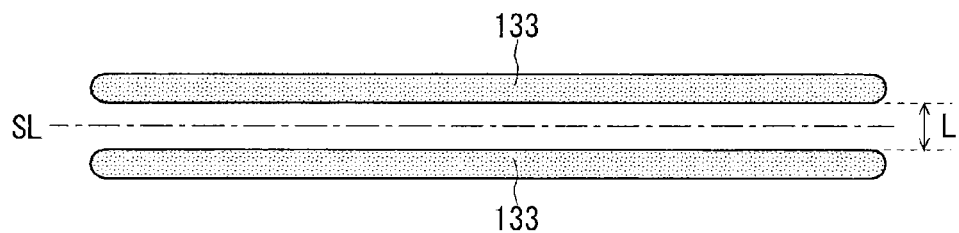
FIG. 13 is a plan view showing a state where gap holding members are formed near the opposite sides of a scribe line.

FIG. 13 shows an example where the gap holding members 133 are provided not directly below a scribe line SL, but are arranged near the opposite sides of the scribe line SL and along the scribe line SL.

In this case, the interval L between the two gap holding members 133 is also determined according to the formula (1). This structure increases a cutting margin. Also, like the arrangement of the gap holding members 133 directly below a scribe line, this structure forms rib marks continuously to allow stable cutting of a substrate.

If the mother cell substrate 30 in which the gap holding member 133 are arranged in the aforementioned manner is cut along a scribe line, the gap holding members 133 extend continuously to a position spaced inwardly of the edges of the TFT substrate 110 and the CF substrate 120 by the certain distance d (in a range of from 40 to 100 µm, for example) as seen in the plan view of the TFT substrate 110 and the CF substrate 120.

The distance d is about half the interval L defined by the formula (1). So, the effect achieved by satisfying the formula (1) is also achieved if the distance d is shorter than $(a/2)t^3$.

The gap holding members 133 are formed directly below a scribe line, or near the opposite sides of a scribe line SL. While the cutting margin of ultrathin glass can be increased in either case, conditions for scribing are determined appropriately for the respective cases.

As an example, the gap holding members 133 function effectively as a supporting member if they are formed directly below a scribe line SL. In this case, rib marks are formed even applied scribing pressure is low. Conversely, if applied scribing pressure is too high, ultrathin glass may be subjected to unnecessary damage such as chipping and cracking.

Meanwhile, if the gap holding members 133 are placed near the opposite sides of a scribe line SL, rib marks cannot be formed in some cases unless scribing is performed by applying pressure higher than that applied if the gap holding members 133 are formed directly below a scribe line SL.

If the thickness of the CF substrate 120 is 80 µm and the gap holding members 133 are formed directly below a scribe line SL, a proper pressure of a cylinder for controlling scribing is 0.09 MPa. Meanwhile, a proper pressure of this cylinder is 0.12 MPa if the gap holding members 133 are formed near the opposite sides of the scribe line SL.

Figure 14:
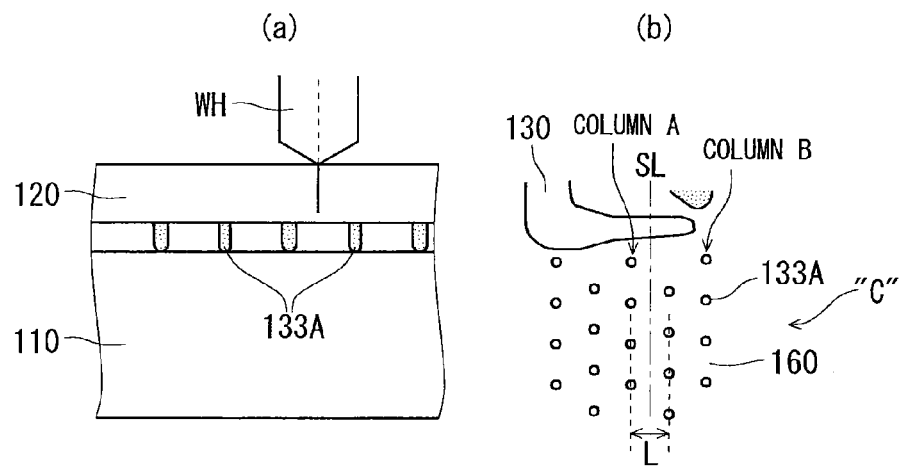
FIG. 14 shows sectional and plan views of a region near a scribe line including an inlet.
Figure 15:
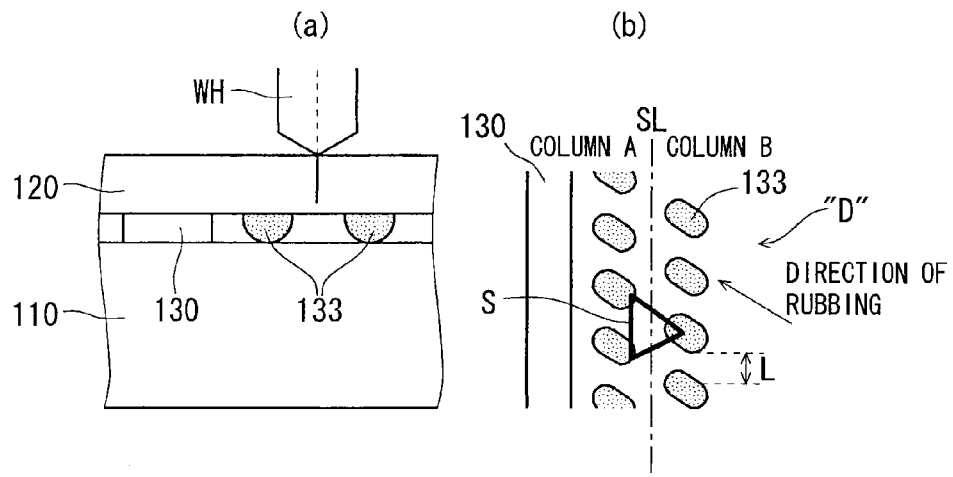
FIG. 15 shows sectional and plan views of a region near a scribe line not including an inlet.

FIG. 14 shows a region C near a scribe line including the inlet 160. Part (a) of FIG. 14 is a sectional view and part (b) of FIG. 14 is a plan view. FIG. 15 shows a region D near a scribe line not including the inlet 160. Part (a) of FIG. 15 is a sectional view and part (b) of FIG. 15 is a plan view.

As shown in part (b) of FIG. 14, a plurality of gap holding members 133A are arranged inside the inlet 160 as an opening portion of the main seal pattern 130. The gap holding members 133A each have a sectional area considerably smaller than that of each of the gap holding members 133 shown in part (b) of FIG. 15. As an example, the width of the gap holding members 133 in the longitudinal direction thereof is about 200 μm, whereas the width of the gap holding members 133A is about 15 μm.

This is intended to avoid inhibition of deaeration and injection of liquid crystal as the inlet 160 is an opening portion through which air is expelled from a cell and liquid crystal is injected into the cell. Further, placing the gap holding members 133A closely inhibits deaeration and injection of liquid crystal. So, like the gap holding members 133, the gap holding members 133A are separated by the space L.

As a result, unlike a region except the region C near a scribe line including the inlet 160, the area share of gap holding members placed near the scribe line SL (ratio of spacer area per unit area) cannot be increased in the region C as shown in part (b) of FIG. 14. So, the gap holding members cannot function effectively as a supporting member.

The width of the gap holding members 133A in the region C is about 15 μm. This makes it impossible to perform scribing stably on the gap holding members 133A if the accuracy of positioning of a cutting unit is greater than 15 μm. In this case, in order for the gap holding members 133A to function effectively as a supporting member, the gap holding members 133A should not be arranged directly below a scribe line, but should be arranged at positions spaced from a scribe line by a distance corresponding to or greater than the accuracy of positioning. In the preferred embodiment, the accuracy of positioning of a cutting unit is plus or minus 40 μm.

Thus, the optimum value of scribing differs between the region C near a scribe line including the inlet 160 and a region except the region C (specifically, region D). To be specific, a proper pressure of a cylinder for controlling scribing is 0.09 MPa that is determined if the gap holding members 133 are formed directly below a scribe line SL in a region except the region C. Meanwhile, a proper scribing pressure of this cylinder is 0.12 MPa or higher in the region C. This means that a proper condition differs between regions along the same scribe line, leading to reduction of a cutting margin.

In response, in the region D near a scribe line not including the inlet 160, the gap holding members 133 are arranged discontinuously near the opposite sides of a scribe line SL and along the scribe line SL as shown in part (b) of FIG. 15. To be specific, a difference in a proper value of scribing pressure between the regions C and D can be reduced by placing the gap holding members 133 in columns A and B near the opposite sides of the scribe line SL and along the scribe line SL. As a result, scribing can be performed at common scribing pressure of 0.12 MPa in the regions C and D.

Further, as shown in part (b) of FIG. 15, effect on rubbing can be reduced by arranging the discontinuously placed gap holding members 133 along the direction of rubbing. To be specific, if rubbing proceeds in a direction oblique to a scribe line SL, the gap holding members 133 in the form of ovals are arranged such that the direction of the gap holding members 133, which is specifically the longitudinal direction thereof, agrees with the direction of rubbing. This arrangement reduces the probability of inhibition of rubbing.

Tip positions of the gap holding members 133 in the columns A and B are shifted as seen from a triangular region S shown in part (b) of FIG. 15. This makes it possible to distribute pressure uniformly applied from the scribe wheel WH as described below by referring to FIG. 16.

Figure 16:
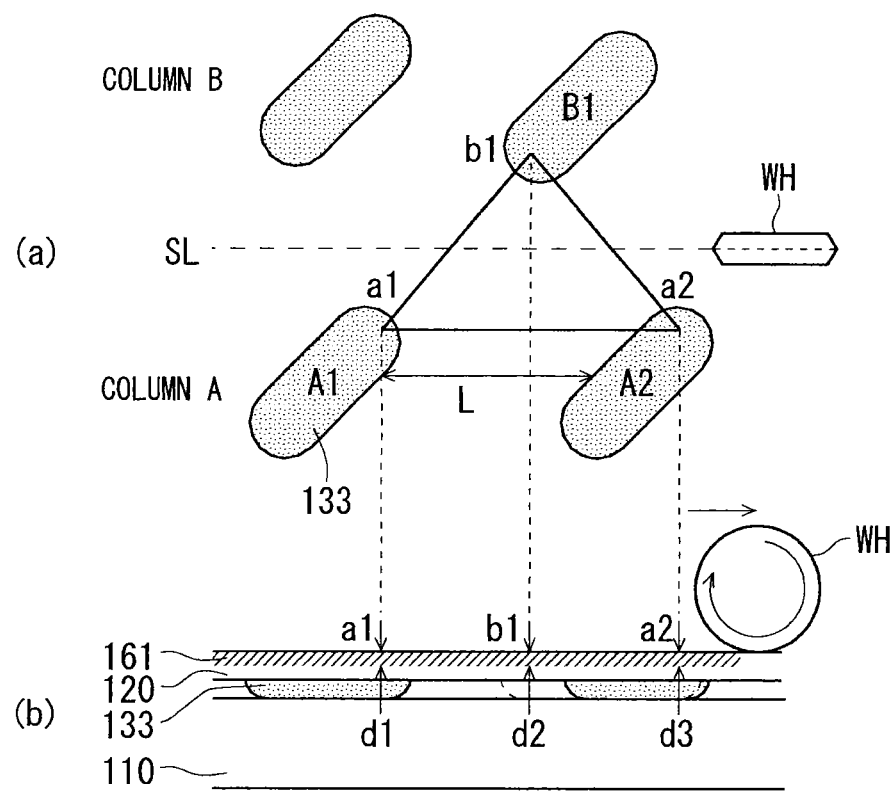
FIG. 16 shows plan and sectional views explaining an effect achieved by placing gap holding members.

Part (a) of FIG. 16 is a plan view of the region S, and part (b) of FIG. 16 is a sectional view corresponding to the plan view of part (a) of FIG. 16.

As shown in part (a) of FIG. 16, two adjacent ones of the gap holding members 133 in the column A near a scribe line SL are called A1 and A2, and one of the gap holding members 133 in the column B near the scribe line SL is called B1. The gap holding members 133 are arranged in the columns A and B in a staggered pattern such that a shape formed by connecting tip positions of the gap holding members 133 called A1, A2 and B1 becomes an isosceles or regular triangle.

The tip positions of the gap holding members A1 and A2 in the column A are called a1 and a2 respectively, and the tip position of the gap holding member B1 in the column B is called b1. Further, the depths of the rib marks 161 in the CF substrate 120 determined at the tip positions a1, a2 and b1 are called d1, d3 and d2 respectively. In this case, the depths d1, d3 and d2 of the rib marks 161 are substantially the same as shown in part (b) of FIG. 16, so that undulations of the rib marks 161 generated by placing gap holding members discontinuously can be reduced.

This is for the reason that pressure applied from the scribe wheel WH is always supported in the triangular region S formed of the three gap holding members 133, thereby distributing pressure uniformly.

The aforementioned arrangement is also applicable to the gap holding members 133A arranged inside the inlet 160 shown in part (b) of FIG. 14. To be specific, the gap holding members 133A are arranged in a staggered pattern on the opposite sides of a scribe line SL as shown in part (b) of FIG. 14. More specifically, a column of the gap holding members 133A arranged on one of the opposite sides of the scribe line SL is called a column A, and a column of the gap holding members 133A arranged on the other of the opposite sides of the scribe line SL is called a column B. The positions of the gap holding members 133A in the columns A and B are shifted from each other so that the gap holding members 133A are arranged in a staggered pattern.

In this case, one of the gap holding members 133A in the column B is arranged at a position corresponding to a midpoint between two adjacent ones of the gap holding members 133A in the column A, so that the two adjacent gap holding members 133A in the column A and one gap holding member 133A in the column B form an isosceles or regular triangle. The gap holding members 133A in columns except those in the columns A and B are arranged to satisfy the same relationship.

As a result, pressure applied from the scribe wheel WH is always supported in a triangular region formed of the three gap holding members 133A, thereby distributing pressure uniformly to realize scribing stably.

The preferred embodiments of the present invention can be combined freely, and each of the preferred embodiments can be modified or omitted where appropriate without departing from the scope of the invention.

While the invention has been shown and described in detail, the foregoing description is in all aspects illustrative and not restrictive. It is therefore understood that numerous modifications and variations can be devised without departing from the scope of the invention.

What is claimed is:
1. A liquid crystal display device, comprising:
first and second glass substrates spaced from each other, the first and second glass substrates being opposite such that main surfaces of the first and second glass substrates face each other;
a seal pattern placed between said first and second glass substrates to bond said first and second glass substrates together, the seal pattern sealing a liquid crystal material in between said first and second glass substrates and holding the liquid crystal material in a form of a liquid crystal layer;

a plurality of columnar spacers placed between said first and second glass substrates in a display region surrounded by said seal pattern and corresponding to a display surface appearing when the liquid crystal display device is in operation, the columnar spacers holding a distance between said first and second glass substrates; and a plurality of gap holding members formed continuously along each of edges of said first and second glass substrates and placed along the outer circumference of said seal pattern at positions spaced by a predetermined distance from each edge of the first and second glass substrates as seen in a plan view, the gap holding members holding a distance between said first and second glass substrates, the area share of said gap holding members indicating the ratio of a sectional area per unit area being larger than the area share of said columnar spacers.

2. The liquid crystal display device according to claim 1, wherein the thickness of said first glass substrate is in a range of from about one-tenth to about one-eighth of the thickness of said second glass substrate, and said predetermined distance satisfies the following formula:

$$d < (a/2)t^3$$

where d is said predetermined distance, t is the thickness of said first glass substrate, and a is a factor of proportionality that is about 0.0004.

3. A liquid crystal display device, comprising:

first and second glass substrates spaced from each other, the first and second glass substrates being opposite such that main surfaces of the first and second glass substrates face each other;

a seal pattern placed between said first and second glass substrates to bond said first and second glass substrates together, the seal pattern sealing a liquid crystal material in between said first and second glass substrates and holding the liquid crystal material in a form of a liquid crystal layer;

a plurality of columnar spacers placed between said first and second glass substrates in a display region surrounded by said seal pattern and corresponding to a display surface appearing when the liquid crystal display device is in operation, the columnar spacers holding a distance between said first and second glass substrates; and a plurality of gap holding members placed along the outer circumference of said seal pattern, the gap holding members holding a distance between said first and second glass substrates, the area share of said gap holding members indicating the ratio of a sectional area per unit area being larger than the area share of said columnar spacers, wherein said plurality of gap holding members are formed discontinuously at predetermined intervals along edges of said first and second glass substrates and directly below the edges as seen in a plan view of said first and second glass substrates, and said plurality of gap holding members each have a shape tilted at a predetermined angle from the edges of said first and second glass substrates as seen in the plan view of said first and second glass substrates.

4. The liquid crystal display device according to claim 3, wherein the thickness of said first glass substrate is in a range of from about one-tenth to about one-eighth of the thickness of said second glass substrate, and said predetermined interval satisfies the following formula:

$$L < at^3$$

where L is said predetermined interval, t is the thickness of said first glass substrate, and a is a factor of proportionality that is about 0.0004.

5. The liquid crystal display device according to claim 3, wherein said predetermined angle corresponds to an angle at which rubbing is performed, the rubbing being performed in orientation process for forming a starting point to define the direction of orientation of liquid crystal.

6. A method of manufacturing a liquid crystal display device, the liquid crystal display device comprising:

first and second glass substrates spaced from each other, the first and second glass substrates being opposite such that main surfaces of the first and second glass substrates face each other;

a seal pattern placed between said first and second glass substrates to bond said first and second glass substrates together, the seal pattern sealing a liquid crystal material in between said first and second glass substrates and holding the liquid crystal material in a form of a liquid crystal layer;

a plurality of columnar spacers placed between said first and second glass substrates in a display region surrounded by said seal pattern and corresponding to a display surface appearing when the liquid crystal display device is in operation, the columnar spacers holding a distance between said first and second glass substrates; and a plurality of gap holding members formed discontinuously at predetermined intervals along each of edges of said first and second glass substrates and at positions spaced by a predetermined distance from each edge of the first and second glass substrates as seen in a plan view, the gap holding members holding the distance between said first and second glass substrates, the method comprising:

forming said plurality of columnar spacers and said plurality of gap holding members together by using the same material while said first and second glass substrates are first and second mother substrates in a state before the first and second mother substrates are divided into said first and second glass substrates, the step of forming said plurality of gap holding members includes forming said gap holding members to each have a shape tilted at a predetermined angle from the edges of said first and second glass substrates as seen in a plan view of said first and second mother substrates.

7. A method of manufacturing a liquid crystal display device, the liquid crystal display device comprising:

first and second glass substrates spaced from each other, the first and second glass substrates being opposite such that main surfaces of the first and second glass substrates face each other;

a seal pattern placed between said first and second glass substrates to bond said first and second glass substrates together, the seal pattern sealing a liquid crystal material in between said first and second glass substrates and holding the liquid crystal material in a form of a liquid crystal layer;

a plurality of columnar spacers placed between said first and second glass substrates in a display region surrounded by said seal pattern and corresponding to a display surface appearing when the liquid crystal display device is in operation, the columnar spacers holding a distance between said first and second glass substrates; and a plurality of gap holding members placed along the outer circumference of said seal pattern at positions spaced by a predetermined distance from each edge of the first and second glass substrates as seen in a plan view, the gap holding members holding the distance between said first and second glass substrates, the method comprising:

forming said plurality of columnar spacers and said plurality of gap holding members together by using the same material while said first and second glass substrates are first and second mother substrates in a state before the first and second mother substrates are divided into said first and second glass substrates, the step of forming said plurality of gap holding members includes the step of forming said gap holding members discontinuously in first, second, third and fourth columns near the opposite sides of a scribe line centered on the scribe line, said gap holding members being formed at predetermined intervals as seen in a plan view of said first and second mother substrates, the gap holding members in the third and fourth columns being formed in a region corresponding to an opening portion of said seal pattern through which said liquid crystal material is injected into space defined by said first and second glass substrates and said seal pattern, said gap holding members in said first, second, third and fourth columns are arranged in a staggered pattern, and said gap holding members in said third and fourth columns have an sectional area smaller than that of said gap holding members in said first and second columns.

* * * * *